(12) United States Patent
Goetz et al.

(10) Patent No.: US 11,611,257 B2
(45) Date of Patent: Mar. 21, 2023

(54) METHOD AND STATOR FOR OPTIMIZED SLOT BASE INSULATION

(71) Applicant: Dr. Ing. h.c. F. Porsche Aktiengesellschaft, Stuttgart (DE)

(72) Inventors: Stefan Goetz, Forstern (DE); Oliver Heil, Ronnenberg (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 36 days.

(21) Appl. No.: 16/787,354

(22) Filed: Feb. 11, 2020

(65) Prior Publication Data

US 2020/0259383 A1   Aug. 13, 2020

(30) Foreign Application Priority Data

Feb. 11, 2019  (DE) .................... 10 2019 103 285.7

(51) Int. Cl.

| | | |
|---|---|---|
| *H02K 15/10* | (2006.01) | |
| *H02K 3/34* | (2006.01) | |
| *H02K 15/00* | (2006.01) | |
| *H02K 15/12* | (2006.01) | |
| *H02K 3/30* | (2006.01) | |
| *H02K 9/22* | (2006.01) | |

(52) U.S. Cl.
CPC ............ *H02K 3/30* (2013.01); *H02K 3/345* (2013.01); *H02K 9/223* (2021.01); *H02K 15/0012* (2013.01); *H02K 15/0018* (2013.01); *H02K 15/10* (2013.01); *H02K 15/12* (2013.01)

(58) Field of Classification Search
CPC .... H02K 15/12; H02K 15/0018; H02K 15/10; H02K 3/345
See application file for complete search history.

(56) References Cited

U.S. PATENT DOCUMENTS

| | | | | |
|---|---|---|---|---|
| 6,664,669 B2 * | 12/2003 | Oohashi | ................... | H02K 3/34 310/179 |
| 7,572,488 B2 | 8/2009 | Huehsam | | |
| 11,183,898 B2 | 11/2021 | Iwaki et al. | | |
| 2006/0165985 A1 * | 7/2006 | Matsukawa | ............... | H01F 1/26 428/384 |

(Continued)

FOREIGN PATENT DOCUMENTS

| | | | | | |
|---|---|---|---|---|---|
| CN | 103178624 A | * | 6/2013 | ................ | B22F 3/18 |
| DE | 102005048793 A1 | * | 4/2007 | ............. | H02K 1/148 |

(Continued)

OTHER PUBLICATIONS

Chinese First Office Action dated Dec. 17, 2021.

(Continued)

*Primary Examiner* — Peter Dungba Vo
*Assistant Examiner* — Jose K Abraham
(74) *Attorney, Agent, or Firm* — Gerald E. Hespos; Michael J. Porco

(57) ABSTRACT

A method is provided for producing a slot base insulation in a stator (210, 220), wherein the stator (210, 220) is part of an electrical machine and is constructed from a ferromagnetic material. The stator (210, 220) is provided with at least one slot (204) to fit a winding wire (122) in the at least one slot (204). The at least one slot (204) is coated with a soft-magnetic insulation material. A stator (210, 220) also is provided with the slot base insulation.

13 Claims, 3 Drawing Sheets

(56) References Cited

U.S. PATENT DOCUMENTS

| | | | | |
|---|---|---|---|---|
| 2006/0177593 A1* | 8/2006 | Huehsam | ................ | B05D 1/06 |
| | | | | 427/458 |
| 2013/0076193 A1* | 3/2013 | Kim | ........................ | H02K 1/02 |
| | | | | 310/216.004 |
| 2013/0162064 A1* | 6/2013 | Kim | ....................... | H02K 15/02 |
| | | | | 427/128 |
| 2017/0104380 A1* | 4/2017 | Teachnor | ............... | H02K 3/345 |

FOREIGN PATENT DOCUMENTS

| | | | | |
|---|---|---|---|---|
| DE | 10 2010 003 127 | | 9/2011 | |
| DE | 102017222055 A1 | * | 6/2019 | |
| EP | 0 884 825 | | 12/2003 | |
| JP | 2004201429 | | 7/2004 | |
| JP | 2004201429 A | * | 7/2004 | |
| JP | 2010081787 A | * | 4/2010 | |
| WO | WO-2018008738 A1 | * | 1/2018 | ............. H02K 3/493 |

OTHER PUBLICATIONS

Search Report dated Dec. 9, 2021.
Chinese First Office Action dated May 12, 2022.
Chinese Search Report dated May 16, 2022.

* cited by examiner

METHOD AND STATOR FOR OPTIMIZED SLOT BASE INSULATION

CROSS REFERENCE TO RELATED APPLICATION

This application claims priority under 35 USC 119 to German Patent Appl. No. 10 2019 103 285.7 filed on Feb. 11, 2019, the entire disclosure of which is incorporated herein by reference.

BACKGROUND

Field of the Invention

The invention relates to an optimized slot base insulation in stators of electrical machines. The invention also claims a stator which is provided with the optimized slot base insulation.

Related Art

Electrical machines used for relatively high voltages, such as those used as traction motors in electric vehicles, first insulate a winding wire using a lacquer. The laminations of a stator in such an electrical machine usually are provided with at least one slot, and the steel to be wound is lined with pre-folded insulation paper before winding. The insulation paper also is referred to as a "slot liner", and usually consists of aramid fibers or inorganic ceramic fibers. Insulation of a slot base with insulation paper creates a second insulation barrier to the electrically conductive stator lamination and covers sharp edges of the lamination to prevent damage to the lacquer insulation of the winding wires. The stator often is connected to ground potential or a potential of the vehicle body, but even in the disconnected state due to insulation faults in two phases would short-circuit these phases to one another.

One problem with slot base insulation using insulation paper is a resulting reduced cross section of the slot. The space taken up by the insulation paper can neither be filled with a winding wire for increasing a copper cross section, which would increase a torque density and reduce losses, nor can it be employed in a magnetic respect, like the iron of the stator for example. However, a size of the slot is usually a trade-off between as much space as possible for the winding wire on the one hand and as small an opening as possible in the iron of the stator, so that the iron between the slots, also called teeth, and on the stator spine over the slots, also called yoke, is not saturated by high magnetic flux. In this case, a machine size usually is limited tightly by installation space and weight. In addition, a thickness of the stator spine usually has to be reduced for thermal reasons to create options for dissipating the heat produced in the slots by the windings. Therefore, the insulation paper is provided at the cost of slot cross section, which should be avoided since it cannot be employed in an electrical respect for the winding wire nor in a magnetic respect for the iron or the stator lamination.

The prior art provides examples of insulating the slot base by coating the stator lamination with an insulating material. For example, DE 10 2010 003 127 A1 discloses a generator for a motor vehicle with an electromagnetically or permanent-magnetically excited rotor and a laminated stator. The stator is fitted with a multiple-section winding that is designed as a plug-type winding. The conductors of the multiple-section winding are interconnected outside the laminated core in a winding head to form the multiphase winding. To improve the electrical insulation and to reduce a risk of damage to the conductor insulation, a plastic coating is applied to the outer annular surface of the stator, the axial end faces and the stator slots, including the embossed portions at the slot edges. Coating is carried out by conventional electrostatic powder coating.

EP 0 884 825 B1 proposes a stator for an electric motor with a stator laminated core body formed from magnetic steel plates that have, in their interior, teeth and joints in a comb-like pattern. The steel plates are layered to align the teeth and joints. Turns are inserted into each of the slots which are formed by joints which are continuously layered in the stator laminated core body. A component that forms a rounded edge is arranged on end surfaces in the layered direction of the stator laminated core body. The stator laminated core body and the component that forms a rounded edge can be coated with an insulator layer at least at those points that contact the winding. The heated stator laminated core body and the component that forms a rounded edge are dipped into a solution of an insulation material for coating. In this case, the insulation material is formed by resin, it also being possible for the component that forms a rounded edge to be constructed directly from the resin.

U.S. Pat. No. 6,664,669 also discloses coating the parts of a stator of an electrical machine that come into contact with turns. The coating material can be an insulating resin formed from silicones or from epoxides.

Against this background, it is an object of the invention to provide insulation of the slot or of the slot base in a stator of an electrical machine, where the insulation avoids the use of insulation paper or another type of insulation that disadvantageously leads to spacing between the stator lamination and the winding wire without providing for penetration of a magnetic flux. Impairment of the magnetic flux induced by the winding wire in the stator of the electrical machine should be suppressed as far as possible.

SUMMARY

The invention relates to a method for producing a slot base insulation in a stator, wherein the stator is part of an electrical machine and is constructed from a ferromagnetic material. The stator is provided with at least one slot to arrange a winding wire and this slot is coated with a soft-magnetic insulation material.

The soft-magnetic insulation material according to the invention provides both electrical insulation and also magnetic conduction of a magnetic flux. The insulation material is optimized for a low hysteresis and therefore low losses in magnetic alternating fields, for example due to remanence, as in permanent magnets. The soft-magnetic insulation material according to the invention advantageously has a high relative permeability $\mu_r$ relative to 1, for example greater than 100 as far as possible. Due to these magnetic properties of an insulation layer constructed using the soft-magnetic insulation material, the at least one slot and therefore a slot cross section can advantageously be increased in size and conversely the ferromagnetic material of the stator can advantageously be reduced since a portion of the magnetic flux can now flow through the soft-magnetic insulation material between the stator and the fitted winding wire. Therefore, the stator no longer has to be able to carry the entire magnetic flux, and accordingly can be made thinner, without being saturated by the magnetic flux flowing through.

The winding wire may be formed from copper and can further advantageously be bound directly and without gaps onto the slot base since the insulation layer suppresses current flow between the winding wire and the stator. Therefore, a higher number of turns of the winding wire can advantageously be achieved by the increase in size of the slot cross section which is now possible. Due to the gap-free winding, the magnetic flux induced by the winding wire can also directly enter the insulation material, so that a lower magnetic resistance advantageously occurs than would be the case if there were a gap.

In one embodiment of the method, at least one edge at at least one end of the slot is covered with the soft-magnetic insulation material. Coating may be performed to produce a rounded surface is produced, or that the at least one edge is rounded beforehand and then is coated with the soft-magnetic insulation material so that a separate insulation layer of the winding wire is not damaged by winding on the at least one edge.

The soft-magnetic insulation material may be a lacquer formed from a liquid component that is admixed with soft-magnetic particles. The liquid component cures after coating of the at least one slot.

The liquid component may be a chemical selected from the group that consists of enamels, polyimides, polyamides, epoxides.

In a further embodiment of the method, a lacquer is selected as the soft-magnetic insulation material. The lacquer is formed from a pulverulent mixture of soft-magnetic particles and resin-like particles, and a curing process is carried out after coating. For example, oxide-based particles can be selected as the resin-like particles. The coating can be implemented by means of electrostatic charging.

Heating may be selected as the curing process. Heating can be performed by means of baking in an oven. However, it is also conceivable to melt the powder mixture by laser light.

A polymer matrix in the soft-magnetic insulation material can be formed from a thermoplastic with a glass transition temperature far above an operating temperature of the electrical machine. The glass transition temperature advantageously lies at least in a temperature class H. The thermoplastic is heated to above its glass transition temperature for curing purposes.

The soft-magnetic insulation material can advantageously be formed from a thermoset which is not completely polymerized and cures right through after coating in the at least one slot of the stator. The use of elastomers is also conceivable.

In a further embodiment of the method according to the invention, soft-magnetic particles with ferrimagnetic properties are selected for the soft-magnetic insulation material. Soft-magnetic particles of this kind can be formed, for example, from ferrites, for example iron oxides. Soft-magnetic particles of this kind advantageously provide a relatively high magnetic conduction in the absence of electrical conduction. As an alternative, paramagnetic substances, which have a lower magnetic conductivity, are also feasible.

In a yet further embodiment of the method according to the invention, soft-magnetic particles with ferromagnetic properties are selected for the soft-magnetic insulation material. Soft-magnetic particles of this kind can be formed, for example, from elementary ferromagnetic substances (Fe, Ni, Co). Since ferromagnetic substances are usually electrically conductive, the particles formed with them are surrounded by their own insulation layer before they are then mixed with the liquid component of the lacquer or, as pulverulent mixture, with, for example, epoxide particles and finally are used for coating the at least one slot. It is conceivable for these ferromagnetic particles to be formed to be small enough that they can have a superparamagnetic effect and therefore inherently remain restricted to a formation of at most one Weiss domain under customary operating temperatures of the electrical machine.

In a further embodiment of the method according to the invention, highly thermally conductive particles are added to the soft-magnetic insulation material for coating. Highly thermally conductive particles of this kind increase the thermal conductivity of the insulation material and are advantageous particularly for dissipating the heat which is produced in the slots by the windings. Highly thermally conductive particles are, for example, zinc oxide (ZnO), titanium(IV) oxide ($TiO_2$) or tantalum(V) oxide ($Ta_2O_5$).

The invention also claims a stator with a slot base insulation, wherein the stator is part of an electrical machine and is constructed from a ferromagnetic material. The stator has at least one slot for receiving winding wire. A slot base insulation, which is or was formed using one embodiment of the method according to the invention is arranged on a surface of the at least one slot.

In one refinement of the stator according to the invention, the stator of the electrical machine has a plurality of stator segments which are stacked one above the other and each have at least one slot. The at least one slot of each stator segment was provided with the slot base insulation in accordance with one embodiment of the method according to the invention before assembly to form the stator.

In a further refinement of the stator according to the invention, the stator has a plurality of stator segments which are stacked one above the other and each have at least one slot. After assembly of all of the stator segments to form the stator has been performed, the at least one slot was provided with the slot base insulation in accordance with one embodiment of the method according to the invention.

Further advantages and refinements of the invention can be found in the description and the appended drawings.

The features mentioned above and those still to be explained below can be used not only in the respectively indicated combination but also in other combinations or on their own, without departing from the scope of the present invention.

The figures are described coherently and generally; identical components are assigned the same reference symbols.

DETAILED DESCRIPTION

Figure 1:
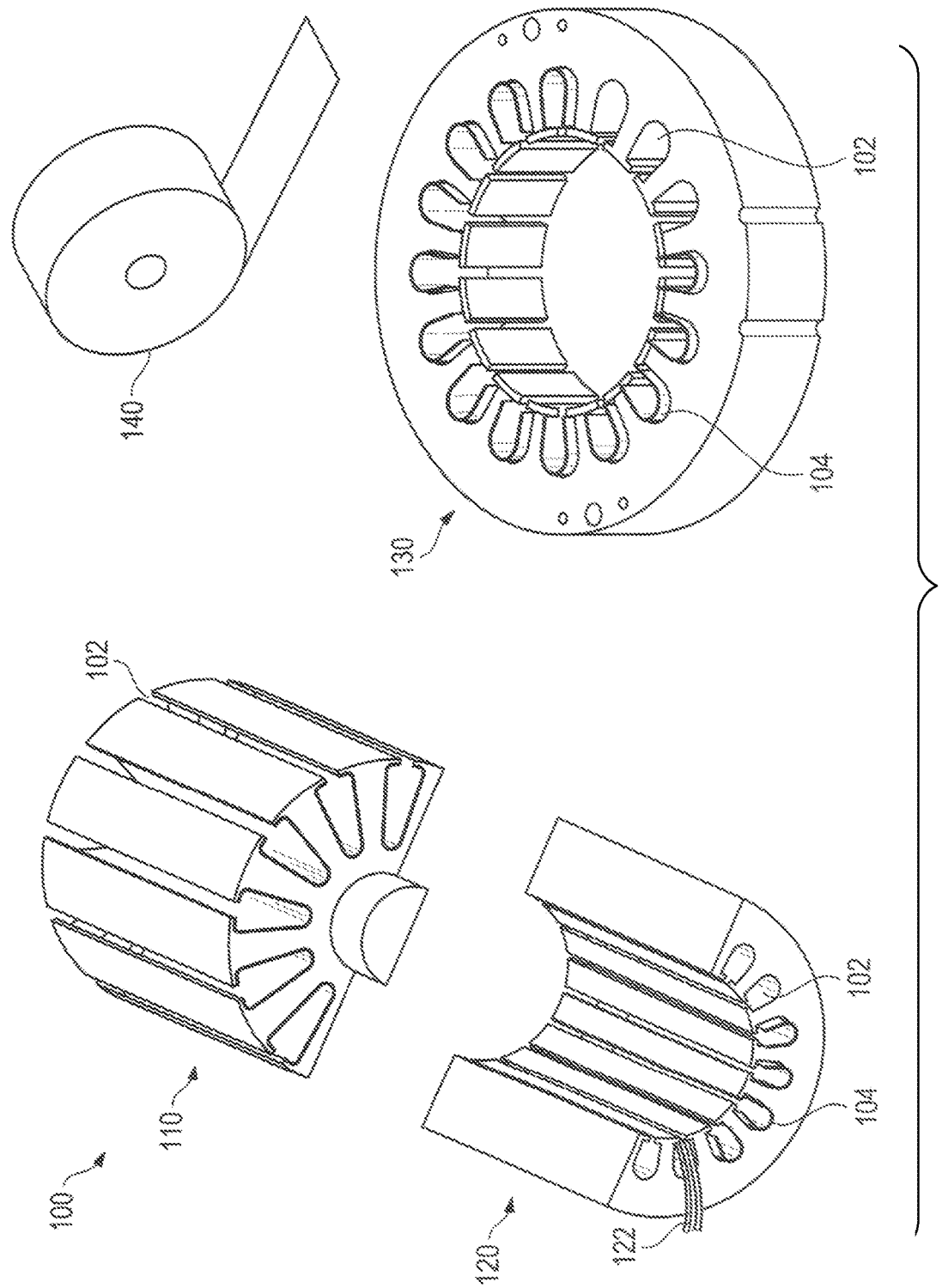
FIG. 1 schematically shows parts of a stator with insulation paper from the prior art.

FIG. 1 schematically shows parts 110, 120, 130 of a stator of an electrical machine with insulation paper 104 from the prior art 100. A respective slot 102 in an upper stator half 110 or a lower stator half 120 or of a stator segment 130 is lined, in accordance with the prior art, with insulation paper 104, for example provided by and separated from an insulation paper roll 140, for insulation from a respective winding wire 122.

Figure 2A:
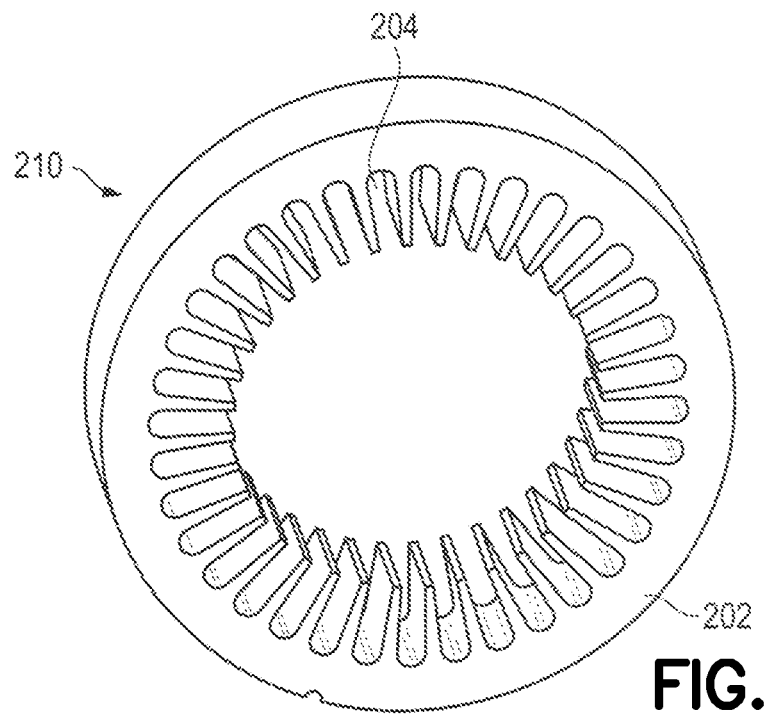
FIGS. 2A and 2B schematically shows stator segments that are coated with insulation material in accordance with embodiments of the method according to the invention and FIG. 2C schematically shows a region of the stator segment of FIG. 2A with the winding wire mounted therein.
Figure 2B:
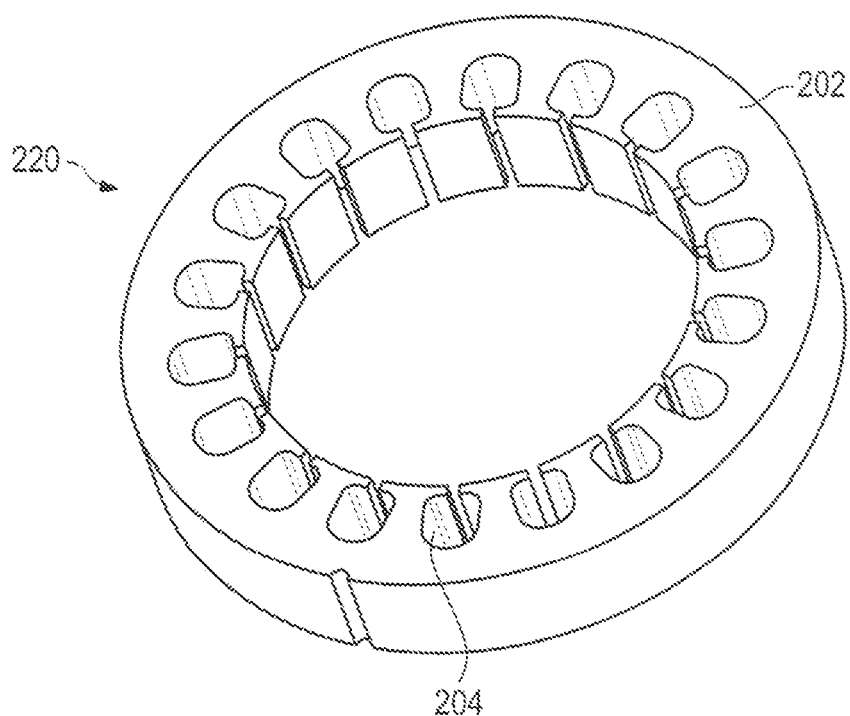
Figure 2C:
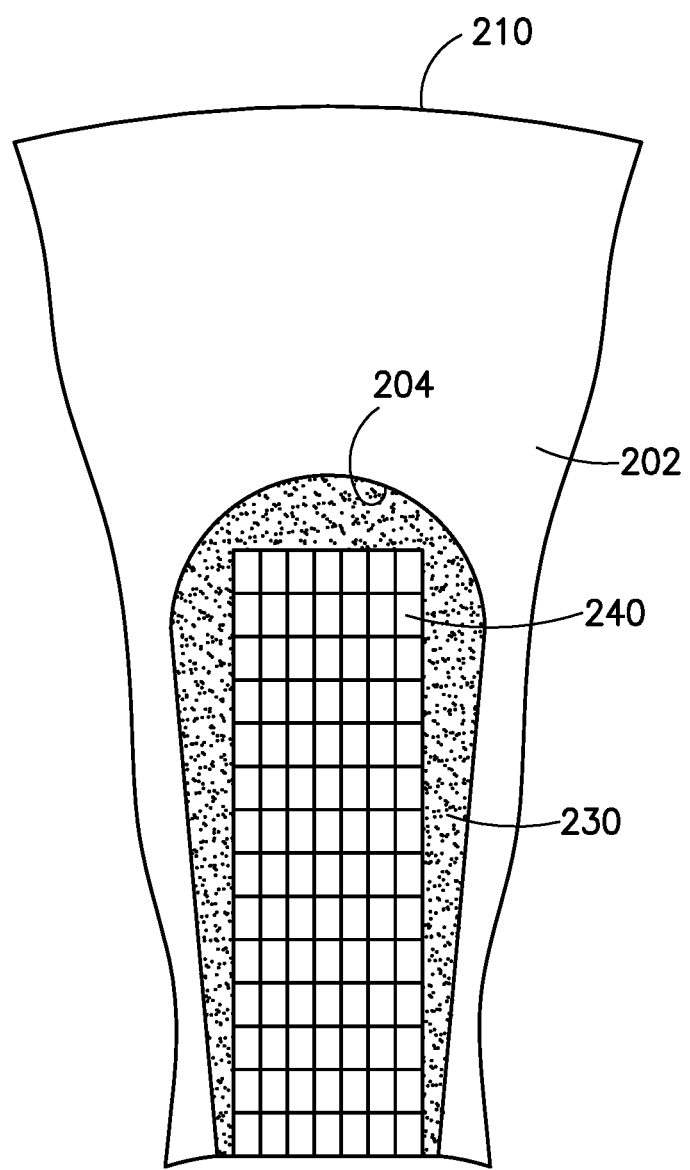

FIG. 2A schematically shows stator segments 210, 220, which are coated with insulation material, in accordance with one embodiment 200 of the method according to the invention. The two stator segments 210, 220 shown in FIG. 2A were coated with a soft-magnetic insulation material which is provided according to the invention in the respective slot 204 and on the respective side surfaces 202 before assembly to form the stator of an electrical machine. FIG. 2B shows the region of the stator segment 210 having the slot 204 that has been coated with soft-magnetic insulation material 230. A winding wire 240 is wound through the slots 204, but the soft-magnetic insulation material 230 is between the winding wire 240 and the ferromagnetic material of the stator segment 210 so that the soft-magnetic insulation material 230 provides both electrical insulation and magnetic conduction and achieves the gap-free winding described above. As explained above, the gap-free winding enables the magnetic flux induced by the winding wire to enter the insulation material directly so that a lower magnetic resistance advantageously occurs than would be the case if there were gaps. A polymer matrix of the soft-magnetic insulation material can be formed, for example, on the basis of 3M 5230N epoxy for powder coating. However, this would be suitable only for electrical machines which do not heat up to further than class F which is a range of between approximately 130° C. and 155° C. here. As an alternative, the use of SolEpoxy DK15EG-05 is also conceivable. According to the invention, soft-magnetic particles are then admixed with said epoxy and the stator segments 210, 220 which form the slot 204 are coated with this soft-magnetic insulation material and, for example, sealed by baking. The side surfaces 202 can also selectively be coated in the process. However, it is also conceivable to perform the coating of the respective slot 204 only after the stator segments, that is to say stator segments 210 or stator segments 220, have been stacked one on the other, wherein the respective stator segments 210, 220 can advantageously be mounted at a relatively small distance in relation to one another without coating of the side surfaces 202.

What is claimed is:

1. A method for producing a stator of an electrical machine, the method comprising: providing a plurality of stator segments, with each of the stator segments being constructed from a ferromagnetic material having opposite first and second side surfaces and a plurality of radially aligned slots extending between the opposite first and second side surfaces of the respective stator segment; coating a soft-magnetic insulation material, a lacquer formed from a liquid component admixed with soft-magnetic particles and thermally conductive particles, onto the ferromagnetic material at each of the slots and then winding a winding wire through the slots so that the winding wire is bound directly and without gaps onto the soft-magnetic insulation material in each of the slots thereby the soft magnetic insulation material separates the winding wire in each of the slots from the ferromagnetic material of each of the stator segments and provides a gap-free winding of the winding wire in each of the respective slots.

2. The method of claim 1, wherein the coating is carried out to coat at least one edge at at least one end of the slot with the soft-magnetic insulation material.

3. The method of claim 2, wherein the method further comprising curing the liquid component after coating of the at least one slot.

4. The method of claim 3, wherein the liquid component is an enamel.

5. The method of claim 1, wherein the lacquer is selected as the soft-magnetic insulation material, the lacquer being a pulverulent mixture of soft-magnetic particles and oxide-based particles, and wherein the method further comprises carrying out a curing process after coating.

6. The method of claim 5, the curing process is carried out by heating.

7. The method of claim 2, wherein the soft-magnetic insulation material comprises soft-magnetic particles with ferrimagnetic properties.

8. The method of claim 1, wherein the soft-magnetic insulation material comprises soft-magnetic particles with ferrimagnetic properties.

9. The method of claim 1, wherein each of the stator segments has opposite first and second axially facing surfaces, the method comprising stacking the stator segments so that the first axially facing surface of one stator segment is opposed to the second axially facing surface of an adjacent stator segment.

10. The method of claim 9, wherein the step of coating the ferromagnetic material is carried out after stacking the stator segments.

11. The method of claim 9, wherein the step of coating the ferromagnetic material is carried out before stacking the stator segments and further comprises coating the first and second side surfaces of each of the stator segments.

12. The method of claim 3, wherein the liquid component is an epoxide.

13. A stator of an electrical machine comprising: a plurality of stator segments formed from a ferromagnetic material, each of the stator segments having a plurality of radially aligned slots formed therein, each of the slots being coated with a soft-magnetic insulation material coating formed from a liquid component admixed with soft-magnetic particles and thermally conductive particles and a winding wire wound through the slots, the winding wire being bound directly and without gaps onto the soft-magnetic insulation material coated to the ferromagnetic material, so that the soft-magnetic insulation material in each of the slots separates the winding wire in each of the slots from the ferromagnetic material of each of the stator segments to provide a gap-free winding of the winding wire in each of the respective slots.

* * * * *